United States Patent
Wahl et al.

(10) Patent No.: US 9,154,595 B2
(45) Date of Patent: Oct. 6, 2015

(54) HANDHELD SUBSCRIBER LINE TEST EQUIPMENT

(75) Inventors: James M. Wahl, Boston, MA (US); Robert J. Medros, Wilmington, MA (US)

(73) Assignee: BROADCOM CORPORATION, Irvine, CA (US)

( * ) Notice: Subject to any disclaimer, the term of this patent is extended or adjusted under 35 U.S.C. 154(b) by 145 days.

(21) Appl. No.: 13/808,116

(22) PCT Filed: Jul. 12, 2011

(86) PCT No.: PCT/US2011/043670
§ 371 (c)(1),
(2), (4) Date: Jan. 3, 2013

(87) PCT Pub. No.: WO2012/009332
PCT Pub. Date: Jan. 19, 2012

(65) Prior Publication Data
US 2013/0101092 A1    Apr. 25, 2013

Related U.S. Application Data

(60) Provisional application No. 61/363,673, filed on Jul. 13, 2010.

(51) Int. Cl.
*H04M 1/21* (2006.01)
*H04M 1/24* (2006.01)
(Continued)

(52) U.S. Cl.
CPC . *H04M 1/24* (2013.01); *H04B 3/46* (2013.01); *H04L 12/2697* (2013.01); *H04L 43/50* (2013.01); *H04M 3/306* (2013.01); *H04M 3/308* (2013.01); *H04L 41/24* (2013.01)

(58) Field of Classification Search
USPC ......... 379/21, 22.03, 25, 26.01, 26.02, 27.03, 379/27.04, 29.01
See application file for complete search history.

(56) References Cited

U.S. PATENT DOCUMENTS 7,027,589 B2    4/2006    Shi et al.
7,453,881 B2    11/2008   Tzannes et al.
(Continued)

FOREIGN PATENT DOCUMENTS

EP    1 619 830    *   8/2004    ............. H04L 12/28
EP    1619830 A1        1/2006

OTHER PUBLICATIONS

International Preliminary Report on Patentability for counterpart international patent application No. PCT/US2011/043670, mailed on Jan. 15, 2013, WIPO; 4 pages.
(Continued)

*Primary Examiner* — Yosef K Laekemariam
(74) *Attorney, Agent, or Firm* — Oblon, McClelland, Maier & Neustadt, L.L.P.

(57) ABSTRACT

A handheld test device includes a keypad having keys associated with tests that can be performed on a subscriber line. The keys are arranged in rows to correspond intuitively with networking layers of the subscriber line and with an order in which to test those layers. Keys of a first row are associated with testing at a physical layer, of a second row with testing at a DSL layer, and of a third row with testing at a service layer. The test device is connected to the subscriber line at a location between CO and CPE, and powered on. In response to being powered on, without technician involvement, the test device automatically detects at least one of CO equipment and CPE on the subscriber line, and trains the test device with the detected equipment.

26 Claims, 5 Drawing Sheets

(51) Int. Cl.
*H04B 3/46* (2015.01)
*H04L 12/26* (2006.01)
*H04M 3/30* (2006.01)
*H04L 12/24* (2006.01)

(56) References Cited

U.S. PATENT DOCUMENTS

| | | |
|---|---|---|
| 7,471,771 B2 | 12/2008 | Wahl et al. |
| 7,738,633 B2 | 6/2010 | Wahl et al. |
| 2002/0126207 A1 | 9/2002 | Brodigan et al. |
| 2003/0093406 A1* | 5/2003 | Zellner et al. .......... 707/1 |
| 2003/0204393 A1 | 10/2003 | Czerwiec et al. |
| 2005/0021835 A1 | 1/2005 | Palm |
| 2005/0226393 A1 | 10/2005 | Smith et al. |
| 2006/0159119 A1 | 7/2006 | Kortum et al. |
| 2006/0209698 A1 | 9/2006 | Defoort |
| 2008/0101401 A1 | 5/2008 | Storry et al. |
| 2010/0278313 A1* | 11/2010 | Summers et al. .......... 379/27.01 |
| 2011/0143747 A1* | 6/2011 | Jia et al. .......... 455/423 |

OTHER PUBLICATIONS

International Search Report and Written Opinion for counterpart international patent application No. PCT/US2011/43670, mailed on Feb. 23, 2012, KIPO; 8 pages.

"30 MHz Copper and VDSL2 Triple-Play Test Set", by NCI Technologies, dated 2011, accessed from Web on Jul. 6, 2011 at www.ncitech.ca/products/datasheets/NCI-465_Datasheet.pdf (2 pages).

30 MHz Copper and VDSL2 Triple-Play Test Set, by NCI Technologies, dated May 3, 2011, accessed from Web on Jul. 6, 2011 at www.ncitech.ca/products/datasheets/NCI-465_Specifictaion.pdf (4 pages).

* cited by examiner

HANDHELD SUBSCRIBER LINE TEST EQUIPMENT

RELATED APPLICATIONS

This application is a 371 application of International Application No. PCT/US2011/043670, filed Jul. 12, 2011, titled "Handheld Subscriber Line Test Equipment," which claims the benefit of and priority to U.S. Provisional Application Serial No. 61/363,673, filed Jul. 13, 2010, titled "Handheld Subscriber Line Test Equipment," the entireties of which provisional and international applications are incorporated by reference herein.

FIELD OF THE INVENTION

The invention relates generally to test equipment. More specifically, the invention relates to handheld test equipment for testing subscriber lines.

BACKGROUND

The advent of high-bandwidth technologies, such as ADSL2+ and VDSL2, which can operate at frequencies up to 30 MHz, has enabled service providers to use their existing copper infrastructure to support new types of services, such as IPTV (Internet Protocol Television). Traditionally, service providers have used POTS (Plain Old Telephone Service) or telephony testing techniques to pre-qualify DSL (Digital Subscriber Line) subscribers or to troubleshoot problems on the copper wire. Generally, the basis of such testing techniques is on narrowband resistive or capacitive measurements. These measurements sufficed for basic internet applications, where service providers typically provisioned the subscriber line below the data rate capacity. The new high-bandwidth services, however, made the subscriber line increasingly susceptible to physical loop impairments and wideband noise disturbers. These impairments and disturbers can produce intermittent service or degrade picture quality. To offer advanced services, therefore, requires DSL testing and diagnostics that can ensure the subscriber lines are able to support the needed throughput, performance, and stability.

SUMMARY

In one aspect, the invention features a handheld test device comprising a keypad having a plurality of keys associated with tests that can be performed on a subscriber line. The plurality of keys is physically arranged in rows on the keypad to correspond intuitively with hierarchical networking layers of the subscriber line and with an order in which testing of those networking layers should occur. A first row of the keypad has keys associated with testing at a physical layer, a second row of the keypad, disposed below the first row of the keypad, has keys associated with testing at a DSL layer, and a third row of the keypad, disposed below the second row of the keypad, has keys associated with testing at a service layer.

In another aspect, the invention features a method for testing a subscriber line with a handheld test device. The handheld test device is connected to the subscriber line at a location between a central office (CO) and customer premises equipment (CPE). The handheld test device is powered on. In response to powering on the handheld test device and without involving technician interaction with the handheld test device, at least one of CO equipment and CPE on the subscriber line is automatically detected. The handheld test device is trained with the detected equipment automatically in response to detecting of at least one of CO equipment and CPE.

In still another aspect, the invention features a computer program product for testing a subscriber line with a handheld test device. The computer program product comprises a computer readable persistent storage medium having computer readable program code embodied therewith. The computer readable program code comprises computer readable program code that, if executed, automatically detects, without technician involvement, at least one of central office (CO) equipment and customer premises equipment (CPE) on the subscriber line in response to powering on the handheld test device, and computer readable program code that, if executed, trains in accordance with the detected equipment automatically in response to detecting at least one of the CO equipment and CPE.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Handheld subscriber line test devices described herein simplify the installation and repair (I&R) processes for technicians. The front panel of the test device has various keys associated with tests that can be performed on a subscriber line. The test keys are arranged in rows. The test keys of a top row are associated with testing at a physical layer, those of a second row with testing at a DSL layer, and those of a third row with testing at a service layer. This row arrangement corresponds intuitively with the hierarchical networking layers of the subscriber line. The order of the rows also intuitively suggests an order in which to test those networking layers, an order that advances up the hierarchy of layers, starting with the physical layer, then the DSL layer, and finishing with the service layer.

When connected to a subscriber line and powered on, the handheld device automatically synchronizes, without technician involvement, with either customer premises equipment (CPE) or central office (CO) equipment, and runs a test sequence comprised of physical, DSL, and service layer tests. LEDs (light-emitting devices) on each test key of the test device show the pass/fail status of the performed tests. The front panel of the test device provides a comprehensive picture of the test results, showing which tests passed and which tests failed at a single glance. Details about the test results are immediately available. Pressing a key with a lit LED provides additional information about the associated test. One key, when pressed, displays a verification code that summarizes results combined from multiple tests in accordance with a rules engine executing on the test device. Accompanying the displayed verification code can be information about the nature and location of a potential problem.

In addition to automatic testing, a technician can manually test the subscriber line by pressing specific keys to perform specific tests. In addition, tests run relatively quickly, less than one minute for a complete dual-ended acceptance test and less than one minute for single-ended troubleshooting.

After detecting an IP connection, the test device can communicate with an LDP (Line Diagnostics Platform) server, from which the test device can download testing thresholds (thus requiring no configuration by the technician) used to determine the pass/fail status of the various tests, and to which the test device can upload synchronization and test results as a benchmark for future tests. These test thresholds can be customized according to the requirements of a service provider for a given service type and saved in a file on the LDP server.

Figure 1:
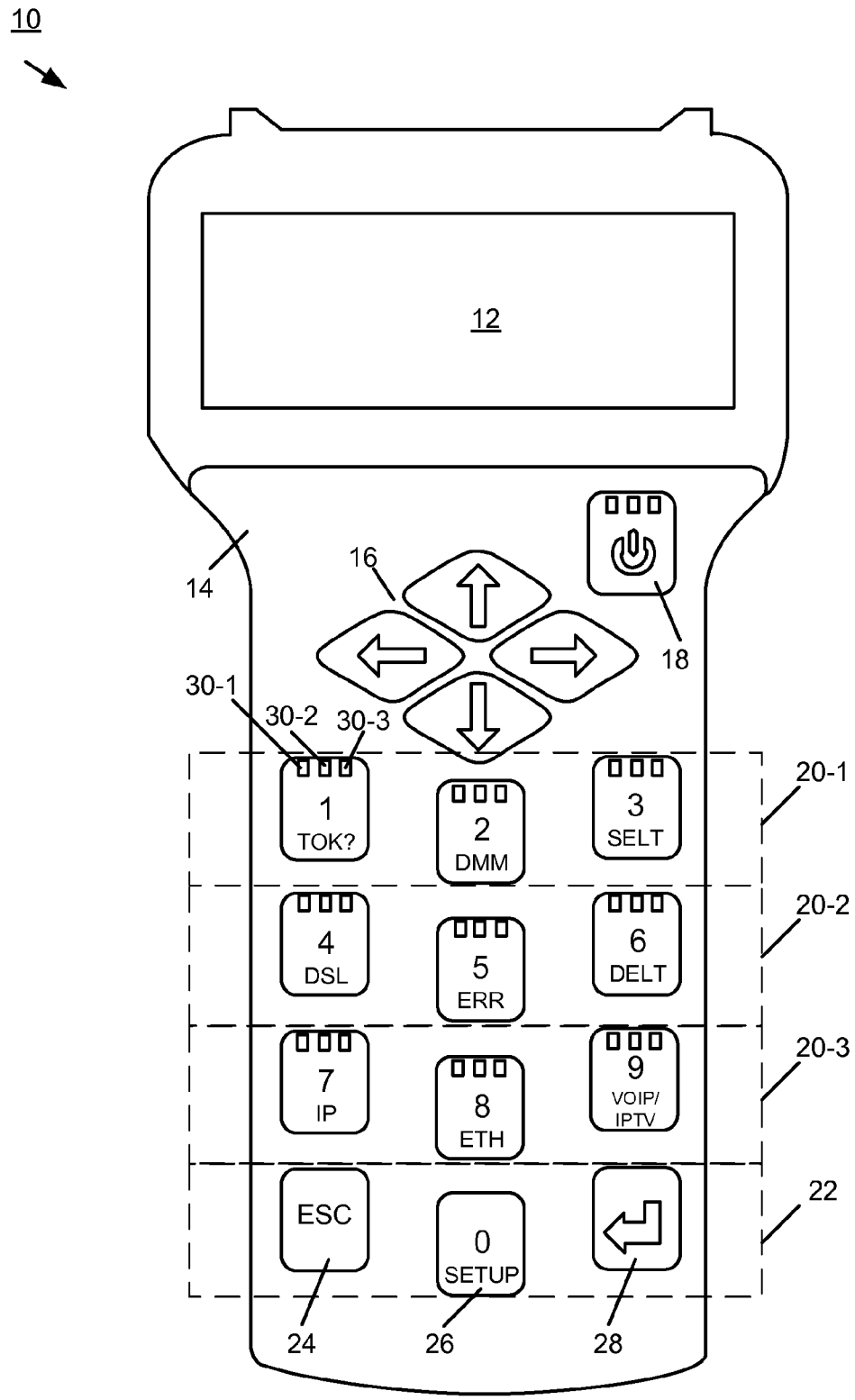
FIG. 1 is a front view of an embodiment of a handheld subscriber line test device.

FIG. 1 shows an embodiment of a handheld subscriber line test device 10 for use in testing a subscriber line. In one embodiment, the test device 10 is approximately 5 inches wide, 10 inches high and 2¾ inches deep, and weighs approximately 3.5 pounds. The front panel of the testing device 10 has a display screen 12 above a keypad 14. In one embodiment, the display screen 12 is a transflective liquid crystal display screen for displaying four twenty-character lines of text. The keypad 14 has a power on/off key 18, directional up, down, left, and right arrow keys 16, three rows 20-1, 20-2, 20-3 of subscriber line test keys (generally, 20), and a fourth row 22 comprised of an escape (ESC) key 24, a setup key 26, and a return (or enter) key 28. The various keys (also referred to as buttons) of the keypad lie substantially flush with a front surface of the test device 10. When a technician sufficiently depresses a given key with the user's finger, the key provides a tactile sensation to signal that the key has been adequately pressed and that the corresponding action has been started.

The power on/off key 18 turns on and off the test device 10, which can run on either AC power or on rechargeable batteries. The arrow keys 16 operate to move up and down between pages of screen displays and to move a cursor forward and back within a given page.

The keys of the top three rows 20 and the setup key 26 of the fourth row are numbered zero through nine, the setup key 26 being labeled with the number zero. In addition, each of the keys of the top three rows 20-1, 20-2, 20-3 and the power on/off key 18 has three different color LEDs, red 30-1, yellow 30-2, and green 30-3, which give a user real-time visual feedback as to the status of the operation or test associated with that key, as measured against pre-programmed thresholds. The red LED 30-1 indicates the operation has failed; the yellow LED 30-2, that the operation has performed marginally; and the green LED 30-3, that the operation has passed. For simplifying the drawing, only the LEDs of the key labeled with number 1 have the reference numerals.

In general, the three rows 20 of keys correspond to hierarchical networking layers of the subscriber line, such layers including a physical layer as a first (lowest) layer, the DSL layer as an intermediate layer, and the services layer as a last (highest) layer. The first row 20-1 of the keypad is associated with testing the physical layer (also referred to as copper testing), the second row 20-2 has keys associated with the testing and diagnostics of the DSL layer, and the third row 20-3 has keys associated with testing at the service layer. This correspondence of rows with networking layers presents an intuitive interface to the technician by delineating between the layers, and, in combination with the numbering of the keys, suggests a preferred order in which testing of those networking layers can proceed, an order that moves up through the layers from the lowest to the highest by running tests in the first, then in the second, and then in the third rows.

Figure 2:
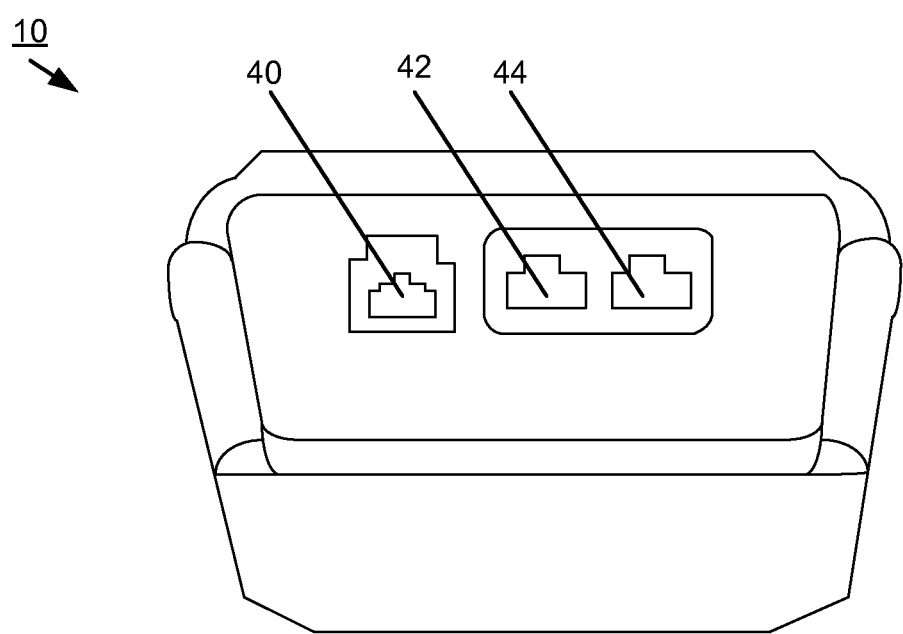
FIG. 2 is a top end view of the handheld subscriber line test device.

FIG. 2 shows a top end view of the test device 10 with an RJ-11 port 40, an RJ-45 Ethernet PC/Network port 42, and a RJ-45 Ethernet test port 44. The RJ-11 port 40 provides a DSL interface adapted to receive a cable for connecting the handheld test device to the subscriber line under test. In one embodiment, the Ethernet ports 42, 44 are 10/100 Base-T ports. The RJ-45 PC/Network port 42 is adapted to receive an Ethernet cable for connection to a local computer, such as a laptop, or to a server on a network, such as an LDP server on an Intranet. The RJ-45 Ethernet test port 44 is adapted to receive an Ethernet cable for connection to a network, such as the Internet, or to another handheld subscriber line test device. Generally, the RJ-45 Ethernet test port 44 is configured to receive an IP address, wherein the test device acts like a set-top box or other device in the home (i.e., customer premises).

Returning to FIG. 1, the first row 20-1 of keys is labeled, from left to right: TOK? (1), DMM (2), and SELT (3). The DMM (2) and SELT (3) keys are associated with copper testing. The TOK? (1) key, also called the Test OK key, is a test flow button. Pressing this key after completion of an automated test sequence (described in more detail below) operates to combine multiple test results (e.g., those of the DMM, DSL, IP layer) by combining the rules and thresholds of the multiple tests, to select and display a summary code (Ver Code) based on the combined results, and to recommend a repair action if appropriate. The LEDs 30 of the Test OK (1) key blink green when the analysis is in progress, turns solid green when the analysis indicates the subscriber line has passed the automated tests, and becomes solid red when the subscriber line has failed. The summary code (or Ver Code) serves as a shorthand mechanism for indicating generally a location of a detected fault, whether in the network, central office, outside plant, or in the home. Where multiple faults are found, the test flow analysis guides the technician to an initial repair recommendation. The recommended repair is automatically determined based on the procedures of the service provider and on an estimated efficacy of the various repair options.

For example, if the subscriber line passes the multiple tests, activation of the Test OK key can cause the following information to display: "Ver Code: TOK (test OK); Action: None". Alternatively, if the subscriber line fails the multiple tests, the display screen might show, for example, "Ver Code: OSP2; Action: High RFI noise. Suspect bond/grounding or flat drop wire. Retest at NID to determine if in-home issue." The particular messages and test thresholds are customizable and stored in a system-wide configuration file. Table 1 shows one example list of verification codes, conditions, and repair-guidance messages.

TABLE 1

| Ver Code | Condition | Messages |
| --- | --- | --- |
| OSP1 | High wideband noise. | Suspect unbalanced loop or crossed pair. Verify the loop balance using dedicated test equipment. |
| OSP2 | High RFI noise. | Suspect aerial bonding-grounding issue or flat drop/in-home wire. Repeat test with modem at NID to |

TABLE 1-continued

| Ver Code | Condition | Messages |
|---|---|---|
| | | determine if OSP or in-home issue. |
| OSP3 | Time-varying wideband noise. | Suspect crosstalk or resistive fault, such as water in the cable. Verify cable pair with test equipment. If pair tests OK, change the cable pair to reduce crosstalk. |
| OSP4 | Bridged tap. | Condition cable pair by removing bridged tap. |
| OSP5 | Short circuit. | Repair short circuit in outside plant. |
| OSP6 | Open circuit. | Open circuit detected before customer premises. |
| OSP7 | Degraded contact. | Degraded or intermittent contact detected. |
| PREM1 | Fault in or near home. | Suspect in-home problem, such as missing microfilter, incorrect wiring, or defective CPE. Dispatch to the home. |
| PREM2 | Missing microfilter or splitter in home. | Verify all telephones, fax machines and other equipment connected to the home phone wiring has a microfilter. Or install splitter at home. |
| PREM3 | Switch-mode power supply harmonics detected. | DC power supply detected in—or near—home. Check wire between NID and modem. Check corroded, bad connection in NID or near home. |

The DMM (2) key is associated with performing various digital multi-meter tests of the copper line (i.e., twisted pair). Activating the DMM (2) key performs various types of tests on working wire pairs and on non-working pairs. The tests can include detection of hazardous currents and voltages. For these tests, the RJ-11 port is connected to the subscriber line. The tests produce multiple screens of measurements for the capacitive loop length, capacitive balance of the line, longitudinal balance of the line, a count of load coils, voltages (DC and AC), resistance, and capacitance across all three pairs of terminals, circuit noise, power influence, ground resistance, and a receiver off the hook, if detected. A technician can step through the various pages of screen displays using the directional arrows 16. The LEDs of the DMM (2) key present a solid green if the tests are within predefined thresholds and solid red if one or more of the tests fails its corresponding threshold.

Pressing the SELT (3) key operates to perform a single-ended line test on a subscriber line to allow qualification of the copper pair for an xDSL service. For the SELT test, the RJ-11 port is connected to the subscriber line. The SELT test can originate from a cross-connect point toward the customer premises to determine if a twisted pair can support a given xDSL service or from the customer NID on the twisted pair to the cross-connect point. The single-ended line test checks for a missing microfilter, performs a 30 MHZ spectral analysis, performs an impulse noise analysis, and measures the distance to any detected fault. The combined analyses within the SELT test complete in approximately 1 minute.

A separate screen page can be used to the results of each test; a technician uses the arrow keys to step through the screen pages: a first screen can show the presence or absence of the micro-filter, the loop length, and whether or not a fault was detected on the line; a second screen page can show the results from the spectral analysis test at specified frequency bands; and a third screen page can show the results (in real-time) of the impulse noise test, presenting a count of impulses that exceed various INP protection levels. In one embodiment, in addition to or instead of counting the number of noise pulses that exceed a predetermined threshold, the test device counts the number of impulse noise pulses that exceed a predetermined threshold and have a width (duration) that exceeds a predefined minimum period. The LEDs of the SELT (3) key present a solid green if the tests are within pre-programmed thresholds and solid red if one or more of the tests fails a corresponding threshold.

The keys of the second row 20-2 are labeled, from left to right: DSL (4), ERR (5), and DELT (6). Pressing the DSL (4) key manually starts a DSL test (the DSL test also executes automatically upon power-up of the handheld test device 10). For the DSL test, the RJ-11 port is connected to the subscriber line. During the DSL test process, the handheld test device is programmed to detect the CO (Central Office) and CPE (Customer Premises Equipment) if either is present on the subscriber line and to start training in the appropriate xTU-R or xTU-C mode. While the test device is training, the LEDs of the DSL (4) key blink green.

More specifically, upon detecting CPE on the subscriber line, the test device automatically switches to the CO mode. In the CO mode, the test device emulates the DSLAM, training in an xTU-C (ATU-C, VTU-C) mode. For purposes of syncing with the CPE, the test device can use a "worst-case" maintenance profile that achieves syncing where standard profiles might otherwise fail. The following information may appear on the screen to indicate that the test device is in the ATU-C mode training to the modem in the CPE:

"Mode: ADSL2+ A CPE, Stat: GSHK, Fail: none, Serv: n/a".

In addition, upon detecting CO equipment, the test device automatically switches to CPE mode, training in an xTU-R (ATU-R, VTU-R) mode. For example, the following information may appear on the screen to indicate that the test device is in an ATU-R mode, training to the modem in the CO DSLAM:

"Mode: ADSL2+ A CPE, Stat: Training, Fail: none, Serv: n/a".

After training successfully completes, the LEDs of the DSL (4) key becomes solid green and following information may appear on the screen:

"Service: HSIA 1.5M, Test From: Home, CID: 221-231-1232, [ESC-skip] [↵-Save]".

The technician uses the right arrow key to select the type of service profile being tested. In this example, the technician selects the HSIA 1.5M service. Selecting a service type operates to select a specific set of thresholds that determine the pass or fail status for the test being performed. Again, using the arrow keys, the technician selects the location at which the technician is performing the current test. In this example, the test is being performed at the customer's home. Selection of the test location also determines the selection of a specific set of thresholds that determine the pass or fail status for the location. The technician then uses the arrow keys to move the cursor to the CID: field, and enters the Circuit ID, which is typically the telephone number of the subscriber. After entering the information, the technician can press the enter key to save the information and the associated test results. In response, the test device displays statistical information about the upstream and downstream data rates and associated margins. The following information, for example, may be displayed on the screen:

"A2+ A: Rate: 806 (US) 21024 (DS); Max: 1087 (US) 27365 (DS); Margin: 6.5 (US) 7.1 (DS) ↓".

In this display, "US" represents the upstream direction, "DS" represents the downstream direction, and "Max" indicates the maximum data rate the subscriber loop can support.

If the technician presses the down arrow key (↓), additional statistical information related to impulse noise protection (INP), loop attenuation (LATN), and loop length (EWL) and gauge (AWG) appears on the screen. To measure INP, the test device can count the number of impulse noise pulses that exceed a predetermined threshold and/or the number that have a width greater than a predefined minimum period. An example of such a screen page can have the following information:

"A2+ A: INP: 1.0 (US) 1.5 (DS); LATN: 1.1 (US) 0.0 (DS); EWL: 4000 ft 26AWG ↑".

A technician can use the test device 10 to troubleshoot a detected problem by segmenting the subscriber line. First, the technician can test towards the DSLAM and then towards the CPE to isolate a direction of a cable problem. If the detected problem is in the direction of the CPE, the technician can test at the NID towards the CPE to confirm an in-home problem. Then the technician can test at the CPE to verify malfunctioning customer premises equipment.

Depressing the ERR (5) key displays additional details on the threshold errors detected during the subscriber line test. In response to pressing this key, the screen displays error counts for various categories of errors detected in the upstream and downstream directions. These error categories include FEC (Forward Error Correction), CRC (Cyclic Redundancy Check), HEC (ATM Header Error Correction), ES (Errored Seconds), and SES (Severely Errored Seconds). For example, a first screen page can show the following:

"FEC: 0 (US) 71727 (DS), CRC: 0 (US) 12 (DS), HEC: 0 (US) 0 (DS) ↓".

To view a second page of error statistics, the technician presses the down arrow. As an example, the second page can show the following:

"ES: 0 (US) 3 (DS), SES: 0 (US) 1 (DS), [↵ -Reset Counters] ↑".

Pressing the return key 28 resets the counter values.

When all of the counts are below their respective pre-programmed thresholds, the green LED is on solid (non-blinking). If any one of the counts exceeds a predefined threshold for that counter, the red LED turns on solid.

Pressing the DELT (6) key displays the test results of dual-end line test performed after the handheld test device 10 synchronizes with the CPE. (The DELT executes automatically upon power-up of the handheld test device 10.) After the DELT testing completes, either the green LED or the red LED of the DELT (6) key is lit, indicating that the conditions measured by the DELT test falls within or exceeds a fault threshold, respectively. The screen displays the number of faults detected and the RRE (Rate Reduction Estimates) attributed to the presence of a tap and to the influence of noise. For example, the display screen can present the following:

"Faults: none, Taps RRE: 0 Kbps, Noise RRE: 125 kbps".

The keys of the third row 20-2 are associated with service layer testing and are labeled, from left to right: IP (7), ETH (8), and IPTV (9). Pressing the IP (7) key manually starts execution of an IP (Internet Protocol) test, which includes one or more ping tests and a throughput (speed) analysis. In one embodiment, the IP test is part of an automatic DSL test sequence that executes automatically on power-up of the handheld test device 10. In that test sequence the IP test occurs after the DSL test if the DSL test successfully syncs. Usually, the IP test is run over the DSL connection (i.e., RJ-11 port 40), when the IP test is part of an automated test sequence. The IP test can also be run over the RJ-45 port 44 (FIG. 2), typically when manually running the IP test.

Each ping test pings to a valid IP address with access to the Internet or to any local router that provides an IP address. The LEDs of the IP (7) key blink green while the pinging is in progress, turns solid green if the desired results satisfy a threshold, and solid red if the results fail threshold values. After the ping test executes, the display screen can present information like the following:

"Ping: aware.com, Min: 38 Max: 141, Avg: 42 Loss: 0%, [↵ Retest] ↓".

To retest the current location, the technician presses the return key 28. To ping a different second location, the technician presses the right arrow. If the down arrow is pressed, a screen page appears through which the technician can execute a speed test. Within this screen page, pressing the return key starts a manual speed test, which includes downloading a file from the Internet or from a predetermined test server. A screen page produced after the speed test can appear, for example, as follows:

"Speed Test: DS (100%), 2.1 MB/s, 16.5 Mbps, [↵ -Retest] ↓".

From this screen, pressing the return key retests the speed test, and pressing the down arrow key again causes the screen to display the IP address assigned through the DHCP client. If a DSL connection is established, a DSL IP address appears, otherwise an Ethernet IP address and a gateway IP address appears. An example of a screen display, in which there is no DSL connection, is as follows:

"DSL: 0.0.0.0; Eth1: 192.168.2.39; Eth2: 192.168.2.1; [↵ DHCP Release] ↑".

When there is a DSL connection, the screen display can appear as follows:

"DSL: 67.232.12.59; Eth: 0.0.0.0; [↵ DHCP Release] ↑".

Pressing the return key releases the DHCP address assigned.

The function of the ETH (8) key is to perform an Ethernet test on a network over an Ethernet cable. In this Ethernet test, one end of the Ethernet cable is connected to the Ethernet port 44 (FIG. 2) of the test device 10 and the other end is connected to the network. The Ethernet test performs cable verification, using TDR (time-domain reflectometry) to measure distance to an open or short and to identify which pair of wires has a fault. The Ethernet test also performs cable qualification based on SNR (signal-to-noise) and skew measurements.

When the testing completes, the screen may display the following, for example, provided the Ethernet link is detected:

"IP: 192.168.2.39; Rate-Dplx: 100M-Full; [↵ -DHCP Release] ↓".

This screen page shows the IP address assigned to the test device by the DHCP server and the data rate of the Ethernet link. To view additional information, the technician presses the down arrow key to view, for example, the following screen page:

"Traffic /Tx /Rx
KBytes: /99930 /999930
Errors: /0 /0
[↵ -DHCP Release] ↑ ↓"

This screen page shows the data transmit and receives rates and the number of encountered errors. To view additional information, the technician presses the down arrow key again to acquire the following screen:

"Pair/Qual Status
1, 2: /Pass
3, 6: /Pass
[↵ -Retest] ↓"

This screen page shows the integrity of the Ethernet link connected to the test device. Possible status messages include Pass, Fail, and SNR Low.

To view additional information, the technician presses the down arrow key again to acquire the following screen:
"Perf /Mbps /Err /Jittr
Send: /21 /0.1% /1.9 ms
Recv: /15 /0% /1.2 ms
[⏎ -Retest]"
This screen page shows the speed performance (Perf) of the Ethernet link, for sending and receiving, including measurements of errors and jitter.

If no Ethernet link is detected, the series of screen pages can instead appear as follows:
"Traffic /Tx /Rx
KBytes: /0 /0
Errors: /0 /0
↑ ↓"
With the Ethernet link being down, there are no data transmit and receive rates to measure. The screen page showing the measured length and integrity of the Ethernet link can show, for example, as follows:
"Pair/Qual Status
1,2: /195 ft /Pass
3,6: /197 ft /Pass
[⏎ -Retest] ↓"
When the Ethernet link is down, the length and quality measurements are based on TDR techniques. When the Ethernet link is up, the quality measurements are based on electrical equivalents and SNR techniques. Possible status messages include Pass, Fail, Open, Short and Cross. A short indicates a short between the 1, 2 conductors or between the 3, 6 conductors. A cross indicates a short between one of the conductors 1, 2 with one of the conductors 3, 6.

The screen page showing the speed performance (Perf) of the Ethernet link likewise reflects the condition of the link being down and may appear, for example, as follows:
"Perf /Mbps /Err /Jittr
Send: Link down.
Recv: Link down.
[⏎ -Retest]"
The function of the VOIP/IPTV (9) key is to perform various service-related tests, including HPNA (Home Phoneline Networking Alliance or HomePNA), Coax, VOIP (Voice over IP), and IPTV (Internet Protocol Television) tests. For these tests, the RJ-45 port 44 is connected to the customer's network. If the test device detects a HPNA device, an HPNA test screen page like the following may appear:
"HPNA: Detected 3 devices. Press ⇒ to test HPNA network. [⏎ -Rescan] ↓".
Pressing the right arrow key starts an HPNA test involving each detected HPNA device or gateway. The results of the HPNA test for each detected device appear in subsequent series of screen pages. Such displayed results include rate, errors, and SNR margin. For example, a first screen page can appear as follows:
"HPNA/Mbps/Err /SNR⇒
1->/144 /0% /43
1->3 /14 /0.3% /27*
2->1 /128 /0% /43 ↓"
In this screen page, an asterisk highlights a failure involving devices 1 and 3. The red, yellow, and green LEDs 30 of the VOIP/IPTV (9) key reflect the pass/fail status of such results. Pressing the right arrow transitions to the second screen page of HPNA test results, for example: as follows:

"HPNA /Mbps /Err /SNR⇒
2->3 /96 /0% /27
3->1 /8 /0.2% /26*
3->2 /128 /0% /42 ↓"
The failure involving devices 1 and 3 appears in this screen page also. Pressing the down arrow produces a screen page that shows the last four characters of the MAC address used to identify the HPNA device, the HPNA chipset model, and firmware version of each detected HPNA device. For example:
"Dev: MAC /Model /Ver⇐
1: 62e6 /3210H /1.9.2
2: 1dc4 /3210G /1.9.2
3: 1e9c /3210G /1.8.7 ↓"
Additional information about the HPNA test results can be acquired by pressing the TOK? (1) key. For example, the TOK? (1) key can produce a screen page with the following information:
"Ver Code: PREM5; HPNA quality is poor between nodes 3 and 1. Verify cabling."
Also from the HPNA test screen page, pressing the down arrow key advances to a screen page for performing the Coax test. The Coax test screen page can display, for example, as follows:
"Coax: Connect coax adapter to DSL port. Press ⇒ to test coax wiring. ↓".
Pressing the right arrow key starts the Coax test. The results of the Coax test are displayed in subsequent screens. Such displayed results can include the distance to each splitter or cable end (open) and the overall cable quality (shown as pass/fail) based on noise ingress and cable integrity. For example, first and second screen pages can include the following information:
"Coax: Length-Term; 1: 10 ft-Splitter; 2: 40 ft-Open; 3: 65 ft-Open. ↓"
"Coax: Length-Term; 4: 100 ft-Open; Quality: Pass; [⏎ -Retest]."
Additional information about the Coax test results can be acquired by pressing the TOK? (1) key. For example, the TOK? (1) key can produce a screen page with the following information:
"Ver Code: TOK; Test OK."
Pressing the down arrow (↓) while in the Coax test screen page advances to the VOIP test screen page, for example, as follows:
"VoIP: Ready ⇒ ; No call history. [⏎ -Dial] ↓".
Pressing return initiates a VOIP call sequence. Pressing the down arrow key while in the VOIP screen advances to the IPTV test, which can display test information as follows:
"IPTV: /Avg /Max⇒
Streams: /2 /3
TV Data: /5.3M /6.2M
Errors: /0% /0%"
The keys of the fourth row are, from left to right: the ESC key 24, the setup (0) key 26, and the return key 28. In general, the ESC key 24 operates to skip or cancel a test or process, and the return key 28 operates to save entered data or execute a test or retest functionality. The setup (0) key operates to enter a setup mode within which the technician can configure the handheld test device. In a first screen page displayed in the setup mode, the technician can select a test mode, which can be either "Router" or "Bridge". Router is the standard test mode, whereas Bridge is a pass-through mode, allowing a laptop computer connected to the test device to authenticate to the test device (enabling access to stored test results and the executing of laptop-initiated tests).

Other screen pages in the setup mode enable the technician to view, enter, or edit other configuration information, for example, the units of measurement (e.g., feet), the wire gauge, the language, the date, time, and time zone, the firmware and configuration version numbers of the test device, and the IP address or URL of the LDP server. From one of the screen pages, the technician can check for firmware updates, which are downloaded from the LDP server.

Figure 3:
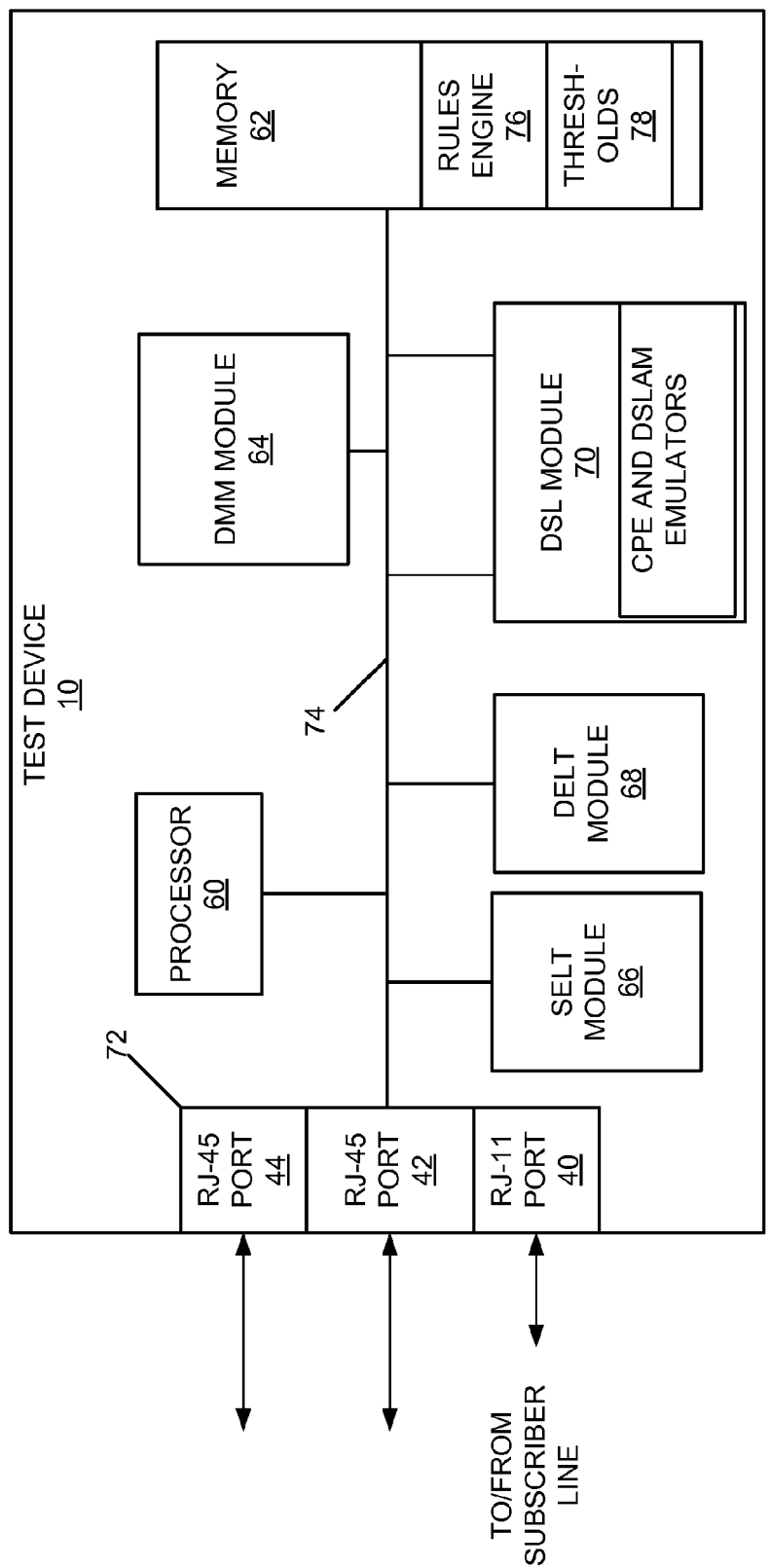
FIG. 3 is a functional block diagram of an embodiment the handheld subscriber line test device.

FIG. 3 shows a functional block diagram of an embodiment of the handheld subscriber test device 10 including a processor 60, memory 62, a DMM module 64, a SELT module 66, a DELT module 68, a DSL module 70, and a network interface (I/F) module 72, each of which is connected to a communications bus 74.

The processor 60 is programmed to control performance of the various aforementioned subscriber line tests and data collection. The memory 62 can include non-volatile (i.e., persistent) computer storage media, such as read-only memory (ROM), and volatile computer storage media, such as random-access memory (RAM). Stored within the ROM is program code, for example, boot-up code for the test device. Stored within the RAM are program code and data. Program code includes, but is not limited to, application programs, program modules, a rules engine 76 that controls the operations and behavior of the test device, and an operating system. Stored data includes sets of thresholds 78 that determine the pass/fail status of the executed tests, test results, and analyses performed on the test results. These thresholds for the various tests can be maintained in (e.g., XML) files.

The DMM module 64 includes hardware, software, firmware, or combinations thereof for executing and collecting measurements for the various DMM tests performed in response to pressing the DMM (2) key. The SELT module 66 includes hardware, software, firmware, or combinations thereof for executing and collecting measurements for the various SELT tests performed in response to pressing the SELT (3) key. The DELT module 68 includes hardware, software, firmware, or combinations thereof for executing and collecting measurements for the various DELT tests performed as part of the DSL tests. The DSL module 70 includes hardware, software, firmware, or combinations thereof for emulating a DSLAM modem, emulating CPE, training, syncing, testing, and collecting measurements for the various DSL tests performed in response to pressing the DSL (4) key. The network I/F module 72 connects to the physical media through the RJ-11 port 40, the RJ-45 PC/network Ethernet port 42, and the RJ-45 Ethernet test port 44, and handles the communications to and from these ports.

The communication bus 74 is the means by which data and controls (commands) move to and from the components and modules connected to the bus, and by which the processor 60 coordinates operations among such components and modules. The communication bus 74 can be implemented using any proprietary or conventional bus architecture and protocols, examples of which include, but are not limited to a Peripheral Component Interconnect (PCI) bus, an Industry Standard Architecture (ISA) bus, and an Enhanced Industry Standard Architecture (EISA) bus. Although shown as a single bus, the communication bus can comprise multiple busses, for example, a memory bus and a control bus.

Figure 4:
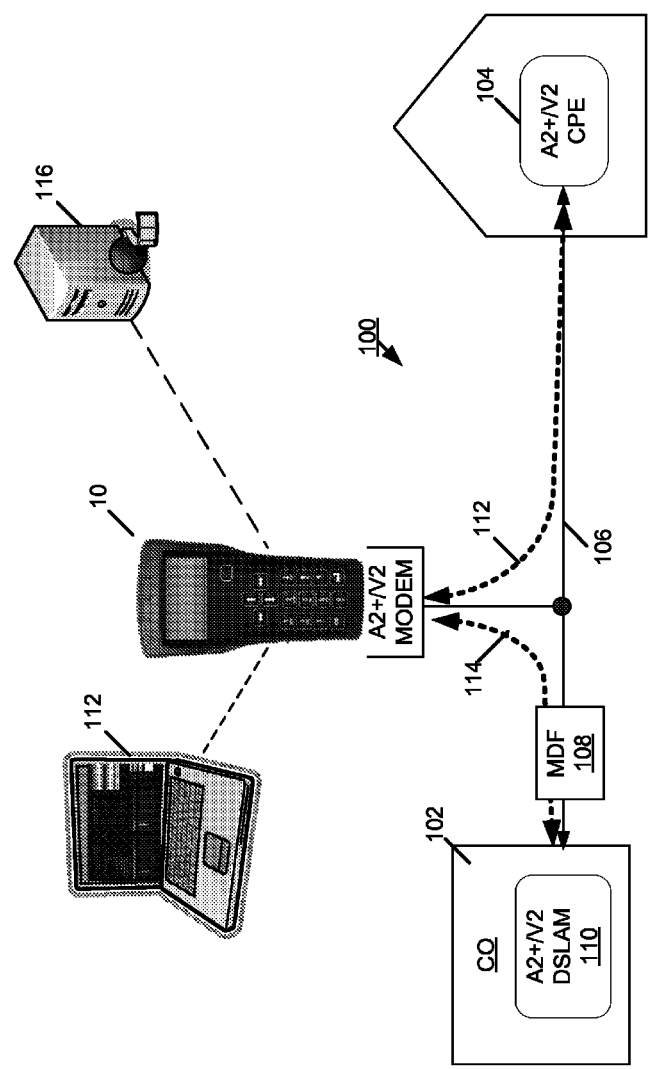
FIG. 4 is a block diagram of an embodiment of a digital subscriber line configuration.

FIG. 4 shows an example of a DSL configuration 100 including a CO 102 in communication with a CPE 104 over a subscriber line 106. DSL communications pass through a main distribution frame (MDF) 108. The CO 102 has a DSLAM with an xDSL modem (e.g., ADSL 2+, VDSL) 110. The CPE 104 can be an xDSL (e.g., ADSL 2+, VDSL) modem particularly adapted to communicate with the type of DSLAM modem 108. The handheld test device 10 can couple to the subscriber line 106 at any convenient location. When testing the subscriber line 106, the test device 10 can emulate the xDSL modem 110 of the CO 102 for purposes of syncing with the CPE 104 (as represented by arrow 112) or emulate the xDSL modem of the CPE 104 for purposes of syncing with the modem 110 of the CO 102 (as represented by arrow 114).

For purposes of illustrating other connections, the test device 10 can be connected to a laptop computer 116 (a representative example of a computing device) running Technician Dr. DSL test software, distributed by Aware, Inc. of Bedford, Mass. To the laptop computer 112, the test device can upload stored test results and analyses. On the laptop computer 112, a technician can annotate the uploaded test results, perform graphical analysis, review details of the spectral analysis, sync, and errors, and perform side-by-side comparisons of multiple test runs of a given subscriber line.

The test device 10 can also be connected to an LDP server 116 from which the test device 10 downloads a configuration file (e.g., XML) comprised of customizable test thresholds and messages.

Figure 5:
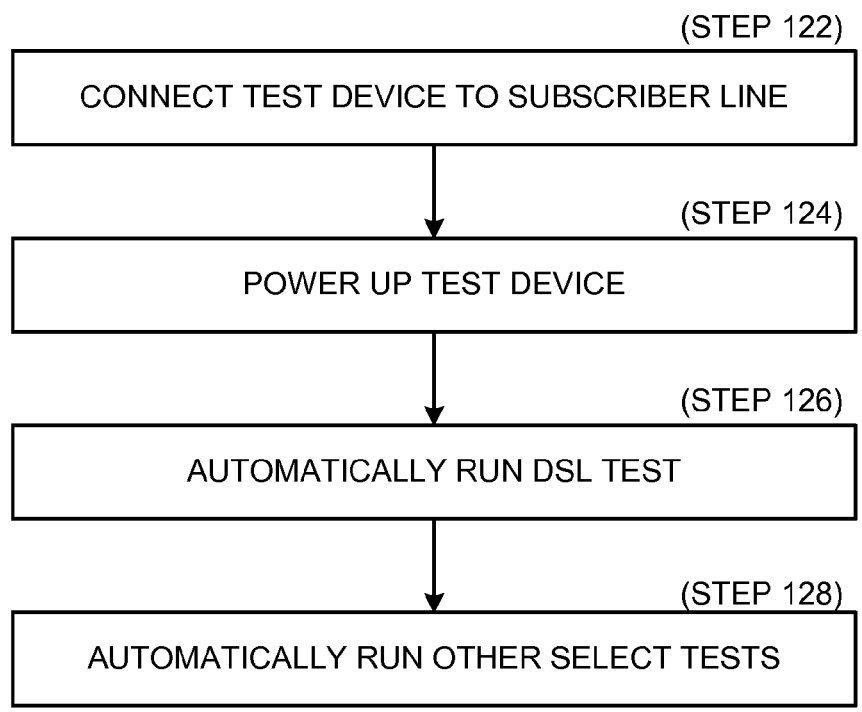
FIG. 5 is a flow diagram of an embodiment of a process for automated testing of a subscriber line.

FIG. 5 shows an embodiment of a process 120 for automated testing a subscriber line. In the description of this process 120, reference is also made to the example DSL configuration 100 of FIG. 4. At step 122, the RJ-11 port 40 of the test device 10 is connected to the subscriber line using RJ-11 test clips. The test device 10 is powered up (step 124). After performing a booting process, the test device automatically starts (step 126) the DSL test without technician involvement. To prepare the subscriber line for the test, the technician 'splits' the line to isolate the DSLAM from the CPE, should both be on the subscriber line. For instance, when the test device is connected at the network interface device (NID) at the side of the home, the technician physically lifts the jumper to break the circuit to allow testing towards the CO or towards the CPE inside the home. Alternatively, when the test device is connected at the CO, the technician breaks the connection at the MDF to test towards the DSLAM for port verification or towards the home for qualification or troubleshooting.

If, during the DSL test, the test device detects the CO, the test device automatically trains and syncs to the DSLAM, enabling the test device to read and subsequently use the DSLAM profile when synchronizing to the modem at the customer premises. This syncing ensures a proper configuration with the correct profile and data rates for communicating with the CPE. Alternatively, the test device can use a "worst-case" profile to sync with the CPE (particularly if no CO is detected on the subscriber line). If, during the DSL test, the test device detects the CPE, the test device 10 automatically trains and syncs to the modem in the CPE. After the training successfully completes, the test device 10 prompts the technician for the CID, service, and test location, and subsequently performs the various measurements associated with the DSL test as previously described in connection with FIG. 1.

After completing the DSL test, the test device 10 can continue (step 128) the automatic test sequence with other tests, for example, a DELT test, IP test, DMM test, a SELT test, or an HPNA/IPTV test in any combination and in any order thereof. For example, one automated test sequence is (1) DSL, (2) IP, and (3) DELT. Another example of an automated test sequence is (1) DSL and (2) DELT. Still another example of an automated test sequence is (1) DSL, (2) DELT, and (3) DMM. Certain tests flow efficiently together in a test sequence, for example, the DMM and the SELT tests, or the ETH and in-home tests. Although each of these examples of automated test sequences starts with the DSL test, other embodiments of automated test sequences can start with a different test, for example, the DMM test or the DELT test.

The results of the various tests are reflected in the LEDs of the various keys associated with the particular tests in the automated test sequence, and in other informational keys, such as the TOK? (1) key and the ERR (5) key. If the LEDs of any of such keys indicate a failure, the technician can press that key to learn of the probable cause and receive guidance for an appropriate corrective action. A symbol, such as an asterisk (*), appearing adjacent a measurement value, can signify that the corresponding parameter is not within specifications.

The above-described methods and systems and can be implemented in a software module, a software and/or hardware testing module, a telecommunications test device, a DSL modem, an ADSL modem, an xDSL modem, a VDSL modem, a linecard, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: xDSL, CDSL, ADSL2, ADSL2+, VDSL1, VDSL2, HDSL, DSL Lite, IDSL, RADSL, SDSL, UDSL, or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

As will be appreciated by one skilled in the art, aspects of the present invention may be embodied as a system, method, or computer program product. Accordingly, aspects of the present invention may take the form of an entirely hardware embodiment (e.g., standard logic circuits or VLSI design), an entirely software embodiment (including firmware, resident software, micro-code, etc.) or an embodiment combining software and hardware aspects. All such forms may be generally referred to herein as a "system". Furthermore, aspects of the present invention may take the form of a computer program product embodied in one or more computer readable storage medium(s) having computer readable program code embodied thereon.

A computer readable storage medium may be any tangible medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include, but are not limited to, the following: a portable computer diskette, a hard disk, a random access memory (RAM), a read-only memory (ROM), an erasable programmable read-only memory (EEPROM, EPROM, Flash memory), an optical fiber, a portable compact disc read-only memory (CD-ROM), an optical storage device, a magnetic storage device, or any suitable combination of the foregoing. Program code embodied on a computer readable storage medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java®, CGI script, Smalltalk, C++ or the like and conventional procedural programming languages, such as the "C" programming language or similar programming languages.

Aspects of the present invention are described herein with reference to flowchart illustrations and block diagrams of methods, apparatus (systems), and computer program products in accordance with embodiments of the invention. Each block of the flowchart illustrations and block diagrams, and combinations of blocks in the flowchart illustrations and block diagrams can be implemented by computer program instructions.

Computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions, acts, or operations specified in the flowchart and block diagram block. Computer program instructions may also be stored in a computer readable storage medium that can direct a computer, other programmable data processing apparatus, or other devices to function in a particular manner, such that the instructions stored in the computer readable medium produce an article of manufacture including instructions which implement the function, act, or operation specified in the flowchart and block diagram block.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions, acts, or operations specified in the flowchart or diagram block.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of program code, which comprises one or more executable instructions for implementing the specified logical function(s). The functions noted in the blocks may occur out of the order noted in the FIGS. For example, two blocks shown in succession may be executed substantially concurrently, or the blocks may sometimes be executed in the reverse order, depending upon the functionality involved. In addition, each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While one or more example embodiments described herein discuss various components of the system as being collocated, it should be appreciated that various components may be located separately (e.g., at distant portions of a distributed network, such as a telecommunications network and/or the Internet or within a dedicated communications network). Thus, it should be appreciated that various components of the system may be combined into one or more devices or collocated on a particular node of a distributed network, such as a telecommunications network.

While the invention has been shown and described with reference to specific example embodiments, it should be appreciated that individual aspects of the invention can be separately claimed and one or more of the features of the various embodiments can be combined. In addition, it should be understood by those skilled in the art that various changes in form and detail may be made therein without departing from the spirit and scope of the invention as defined by the following claims.

What is claimed is:

1. A handheld test device, comprising:
   a keypad having a plurality of keys associated with tests that can be performed on a subscriber line, the plurality of keys being physically arranged in rows on the keypad to correspond intuitively with hierarchical networking layers of the subscriber line and with an order in which testing of the networking layers of the subscriber line should occur, wherein
   a first row of the keypad has keys associated with testing at a physical layer,
   a second row of the keypad is disposed below the first row of the keypad and has keys associated with testing at a DSL layer, and
   a third row of the keypad is disposed below the second row of the keypad and has keys associated with testing at a service layer.

2. The handheld test device of claim 1, wherein each key has a plurality of LEDs to display a real-time pass/fail status of the associated test as measured against predetermined thresholds.

3. The handheld test device of claim 1, further comprising a test flow key that combines results from multiple different tests, produces a summary code based on the multiple different tests, and recommends a repair action.

4. The handheld test device of claim 3, wherein the combined results from the multiple different tests are from different networking layers.

5. The handheld test device of claim 3, wherein the summary code identifies a potential problem location.

6. The handheld test device of claim 1, wherein one or more of the keys are associated with a test that measures impulse noise on the subscriber line, wherein the measuring of the impulse noise includes determining whether a duration of a noise pulse exceeds a predefined threshold.

7. The handheld test device of claim 1, further comprising a processor programmed to automatically detect a central office (CO) equipment and a customer premises equipment (CPE) on the subscriber line, and to start training in a mode appropriate for whichever of the CO equipment and CPE is detected.

8. The handheld test device of claim 7, wherein the processor is programmed to emulate a DSLAM (Digital Subscriber Line Access Multiplexer) in response to detecting the CPE.

9. The handheld test device of claim 7, wherein the processor is programmed to emulate a modem of the CPE in response to detecting the CO equipment.

10. The handheld test device of claim 9, wherein the processor is programmed to read a profile of a DSLAM at the CO equipment for subsequent use when synchronizing to the modem of the CPE, thereby ensuring a proper configuration with a correct profile and data rates for communicating with the modem of the CPE.

11. A method for testing a subscriber line with a handheld test device, comprising:
    connecting the handheld test device to the subscriber line at a location between a central office (CO) equipment and a customer premises equipment (CPE);
    powering on the handheld test device;
    automatically detecting at least one of the CO equipment or the CPE on the subscriber line in response to powering on the handheld test device and without involving technician interaction with the handheld test device;
    training the handheld test device with a detected equipment automatically in response to the detecting of at least one of the CO equipment or the CPE, the training including training and synchronizing to a Digital Subscriber Line Access Multiplexer (DSLAM) when the CO equipment is detected, and training and synchronizing to a modem when the CPE is detected; and
    determining whether to emulate the CPE or the DSLAM in response to detecting the CO equipment or the CPE.

12. The method of claim 11, further comprising emulating the CPE in response to detecting the CO equipment.

13. The method of claim 12, further comprising reading a profile from the CO equipment in response to emulating the CPE; and synchronizing to the modem of the CPE using the profile read from the CO equipment to ensure a proper configuration with a correct profile and data rates for communicating with the modem of the CPE.

14. The method of claim 11, further comprising emulating the DSLAM in response to detecting the CPE.

15. The method of claim 11, further comprising combining results from multiple different tests of the subscriber line, producing a summary code based on the multiple different tests, and recommending a repair action in response to a technician pressing a particular key of the handheld test device.

16. The method of claim 15, wherein the combined results from the multiple different tests are from different networking layers.

17. The method of claim 15, wherein the summary code identifies a potential problem location.

18. The method of claim 11, further comprising measuring impulse noise on the subscriber line, wherein the measuring of the impulse noise includes determining whether a duration of a noise pulse exceeds a predefined threshold.

19. A non-transitory computer program product for testing a subscriber line with a handheld test device, the computer program product comprising:
    a computer readable persistent storage medium having computer readable program code embodied therewith, the computer readable program code comprising:
    computer readable program code that, when executed with circuitry, automatically detects, without technician involvement, at least one of a central office (CO) equipment or a customer premises equipment (CPE) on the subscriber line in response to powering on the handheld test device;
    computer readable program code that, when executed with the circuitry, trains in accordance with a detected equipment automatically in response to detecting at least one of the CO equipment or the CPE, wherein when the CO equipment is detected, the handheld test device is trained and synchronized to a Digital Subscriber Line Access Multiplexer (DSLAM), and when the CPE is detected, the handheld test device is trained and synchronized to a modem; and computer readable program code that, when executed with the circuitry, determines whether to emulate the CPE or the DSLAM in response to detecting the CO equipment or the CPE.

20. The computer program product of claim 19, further comprising computer readable program code that, when executed, emulates the CPE in response to detecting the CO equipment.

21. The computer program product of claim 20, further comprising computer readable program code that, when executed, reads a profile from the CO equipment in response to the computer readable program code that, when executed, emulates the CPE; and computer readable program code that, when executed, synchronizes to the modem of the CPE using the profile read from the CO equipment to ensure a proper configuration with a correct profile and data rates for communicating with the modem of the CPE.

22. The computer program product of claim 19, further comprising computer readable program code that, when executed, emulates the DSLAM in response to detecting the CPE.

23. The computer program product of claim 19, further comprising computer readable program code that, when executed, combines results from multiple different tests of the subscriber line, produces a summary code based on the multiple different tests, and recommends a repair action in response to a technician pressing a particular key of the handheld test device, wherein the summary code identifies a potential problem location.

24. The computer program product of claim 23, wherein the combined results from the multiple different tests are from different networking layers.

25. The computer program product of claim 19, further comprising computer readable program code that, when executed, measures impulse noise on the subscriber line, wherein the computer readable program code for measuring the impulse noise includes computer readable program code that, when executed, determines whether a duration of a noise pulse exceeds a predefined threshold.

26. The handheld test device of claim 1, wherein the first row of the keypad includes a first key to combine multiple test results to display a summary of multiple tests, a second key to perform tests on working and non-working wire pairs of the subscriber line, and a third key to perform a single-ended line test on the subscriber line, the second row of the keypad includes a fourth key to detect a Central Office (CO) equipment and a Customer Premises Equipment (CPE), a fifth key to display details on threshold errors detected during a subscriber line test, and a sixth key to display test results of a dual-end line test on the subscribe line, and the third row of the keypad includes a seventh key to execute an Internet Protocol (IP) test, an eighth key to perform an Ethernet test on a network over an Ethernet cable, and a ninth key to perform service-related tests including Home Phoneline Networking Alliance (HPNA), Coax, Voice over IP (VOIP), and Internet Protocol Television (IPTV) tests.

* * * * *